United States Patent Office 2,810,269
Patented Oct. 22, 1957

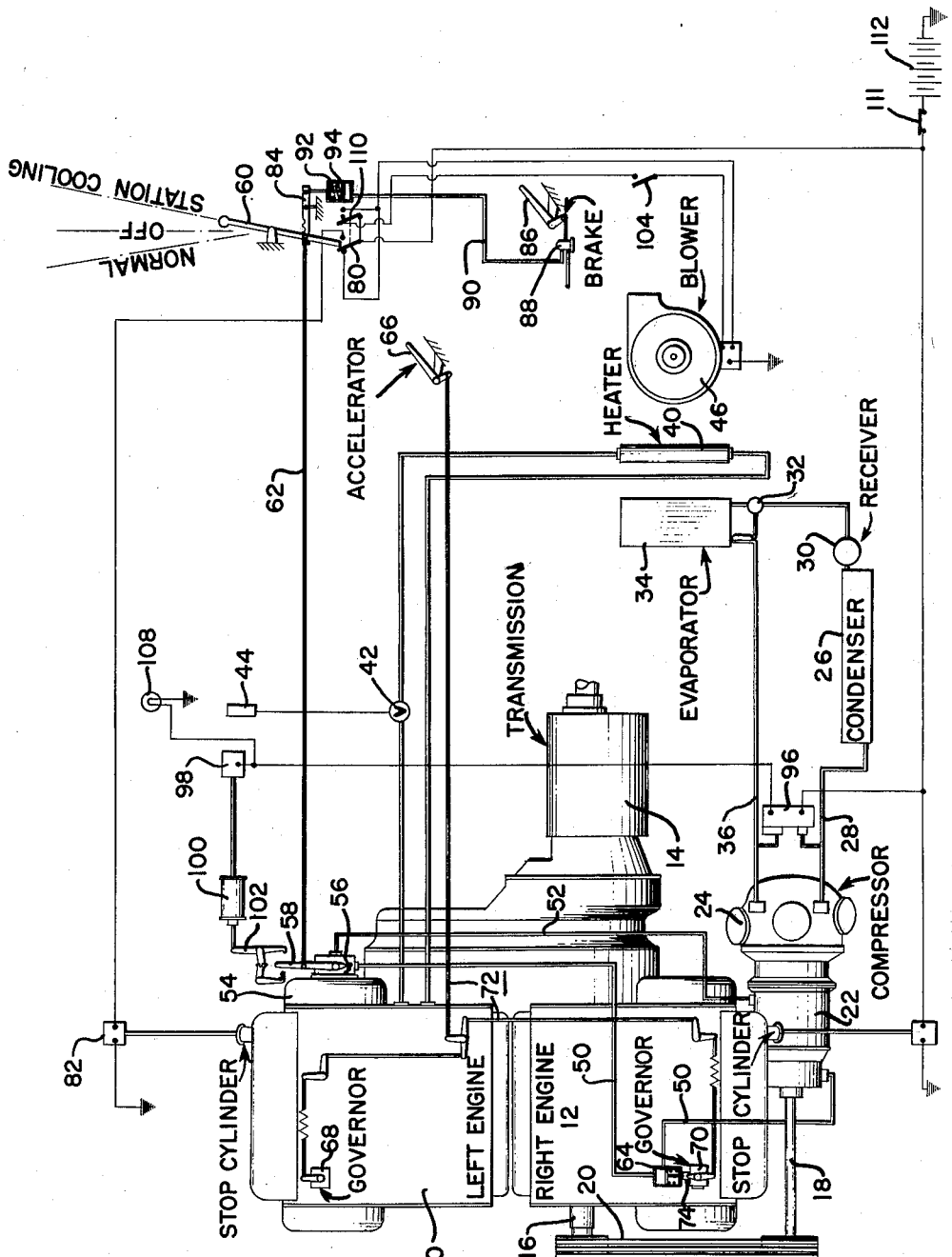

2,810,269

VEHICLE REFRIGERATING APPARATUS

Hans O. Schjolin, Birmingham, Ala., assignor to General Motors Corporation, Detroit, Mich., a corporation of Delaware Application May 6, 1954, Serial No. 427,939

6 Claims. (Cl. 62—117.1)

This invention relates to refrigerating apparatus and more particularly to an improved type of air conditioning system for use on buses and the like.

A number of problems present themselves in designing an air conditioning system for use in installations wherein the prime mover for the refrigerant compressor is a variable speed device which is required to be operated at varying speeds irrespective of refrigeration requirements. One of the problems is that of providing a compressor having adequate capacity at low engine speeds and one which will not be overheated or otherwise injured at the highest engine speeds. Some of these problems may be overcome by providing a variable speed ratio drive between the prime mover and the compressor, but such drives alone are not sufficient to prevent damage to the compressor unless suitable safeguards are provided for preventing operation of the compressor at the highest speed ratio at high engine speeds.

It is an object of this invention to provide a manually operable control for the variable speed drive having the necessary protective devices including means which will make it necessary for the operator to reduce the speed ratio setting before operating the prime mover at the high speeds.

It is another object of this invention to provide an inexpensive and reliable arrangement for controlling the speed of a compressor driven by a variable speed power source.

Another object of this invention is to provide an interlock between the foot brake for the bus and the manual control which controls the operation of the variable speed transmission whereby it is necessary to slow down the engine before changing the speed ratio.

Another object of this invention is to provide a control arrangement which will serve to stop the compressor in response to abnormal pressure conditions within the refrigerant system.

Further objects and advantages of the present invention will be apparent from the following description, reference being had to the accompanying drawings, wherein a preferred form of the present invention is clearly shown.

In the drawing:

The sole view of the drawing shows somewhat schematically a preferred embodiment of the main power unit, the air conditioning system, and the controls therefor.

Referring now to the drawing wherein a preferred embodiment of the invention has been shown, reference numerals 10 and 12 designate a pair of internal combustion engines which are used to propel the bus in accordance with modern practice. These engines may be operated singly or in unison so as to transmit power to the drive wheels of the bus (not shown) through the main bus transmission 14. The construction and operation of the transmission 14 forms no part of this invention and therefore will not be described. The engine 12 is provided with a power take off shaft 16 which drives a shaft 18 through the drive belts 20. The shaft 18 is used to transmit power from the right engine 12 to a variable speed ratio power transmission unit 22 which in turn drives a conventional refrigerant compressor 24.

The transmission unit 22 is of the type which is adapted to drive the refrigerant compressor 24 either directly at the speed of the input shaft 18 or in overdrive at a speed higher than that of the shaft 18. The transmission may also be placed in neutral which makes it possible to stop the operation of the compressor. Insofar as the broader aspects of this invention are concerned the variable speed ratio transmission device 22 may be of any conventional construction although it is preferable that it be of the two speed, planetary gear type fully disclosed in my copending application Serial Number 427,005, filed May 3, 1954, to which reference is hereby made for a more complete description of a preferred form of transmission.

The refrigerant system includes a compressor which is adapted to discharge the compressed refrigerant into a condenser 26 through a discharge line 28 which leads from the compressor to the condenser 26. The liquid refrigerant is fed from the condenser 26 into the receiver 30 from whence it flows through a thermostatic expansion valve 32 into an evaporator 34. The evaporator is adapted to be mounted in an air duct provided in the chassis of the bus in accordance with well known practice. The vaporized refrigerant flows from the evaporator 34 through the suction line 36 back to the compressor 24.

Temperature modulation within the passenger compartment of the bus is obtained by means of a heating coil 40 which may be used for reheating the air leaving the evaporator when the refrigerating system has excess capacity. The heater 40 is adapted to be connected to the cooling system for the engines 10 and 12 so as to receive hot water from the engine cooling system in accordance with well known practice. The flow of hot water through the heater 40 is controlled by means of a modulating water valve 42 which in turn is controlled by a thermostat 44 located in either the passenger compartment of the bus or in the return air stream so as to respond to the temperature within the passenger compartment.

A blower 46 is provided for circulating the air to be conditioned over the evaporator and the heater. Since the arrangement of the blower and the air ducts on the bus is broadly immaterial to this invention they have not been shown. For a more complete description of the ducts and the arrangement of the evaporator 32 and the heater 40 within the ducts, reference is hereby made to my copending application Serial Number 369,910, filed July 23, 1953, now Patent No. 2,774,227.

Since the speed of the main bus engine varies from high speed when the bus is operating on the open highway to a much lower speed when the bus is standing in the station or traveling slowly, it is obvious that a compressor which would be driven directly by the main bus engine and which would have just the right capacity at the highest engine speeds would have inadequate capacity when being driven at the lowest engine speed. The variable speed ratio transmission device 22 compensates for this wide variation in speed so that when the bus is traveling at high speed on the highway the transmission 22 drives the compressor 24 at a lower speed ratio than when the bus is in the station or is traveling at slow speeds. At slow bus speeds the transmission 22 is used to drive the compressor in overdrive so that the compressor is operated at approximately three times the speed of the shaft 18. Before the bus is to be driven at high speed the transmission 22 is manually shifted into direct drive so as to cause the compressor 24 to be driven at the same speed as the shaft 18 operates whereby the compressor capacity remains substantially the same at slow engine speeds as when the engine operates at its highest speed.

For controlling the variable speed ratio transmission shown, fluid-under-pressure is supplied through the fluid line 50 when it is desired to operate the compressor in overdrive. When it is desired to operate the compressor in direct drive fluid-under-pressure is supplied through the fluid line 52 and when it is desired to stop the compressor, the supply of fluid-under-pressure is discontinued in both of the lines. The fluid for controlling the transmission 52 is supplied by a pump 54 which supplies the fluid to a control valve 56 at all times either engine is running. The control valve 56 is provided with an operating lever 58 which is connected to a manually operable control lever 60 through a flexible cable 62. For purposes of illustration, the lever 60 is shown in that position which it occupies for station cooling or when the bus engine is operating at a low speed and the compressor 24 is operated in overdrive. In this position of the lever 60 the valve control lever 58 directs fluid-under-pressure through the fluid line 50. By moving the lever 60 to a position which has been termed the "off" position, the valve control lever 58 cuts off the supply of fluid to both the liquid line 50 as well as the liquid line 52. Just before the bus operator begins to drive the bus at higher speeds he will move the control lever 50 to the left as viewed in the drawing so as to move the valve control lever 58 to a position in which fluid-under-pressure is supplied through the line 52 so as to cause the transmission 22 to operate the compressor in direct drive.

Various safety means have been provided for preventing operation of the compressor in overdrive when the bus engine is operating at its higher speeds. Thus a valve like device 64 has been provided in the fluid line 50 which automatically closes the fluid line 50 when the engine accelerator 66 is pressed down beyond a predetermined point. As shown, the accelerator 66 controls the engine governors 68 and 70 through a linkage mechanism generally designated by the reference numeral 72. A connection 74 is provided between the governor 70 and the valve 64 so that whenever the accelerator is moved to a position in which the speed of the engine 12 increases beyond a predetermined point, the connection 74 will serve to close the valve 64 and thereby stop operation of the compressor in overdrive.

It will also be noted that the lower end of the manual control lever 60 operates a double throw control switch 80 which in the position shown serves to deenergize the left engine control device 82 which then serves to turn off the left engine 10. In other words, whenever the control lever 60 is moved to the position in which it causes the compressor 24 to be operated in overdrive the left engine 10 is turned off.

Shifting of the manually operable control lever 60 at high bus speeds could cause damage to the transmission mechanism 22 and in order to prevent such damage a detent lever 84 is provided which prevents operation of the lever 60 at all times except when the foot brake pedal 86 is depressed. Thus, the brake pedal 86 which is intended to designate the conventional foot brake for the bus controls a valve 88 which is opened when the brake is applied so as to supply fluid-under-pressure in the line 90 which leads to the detent lever operating cylinder 92. Upon the application of pressure within the cylinder 92, the piston 94 will disengage the catch 84 from the control lever 60 so as to allow movement of the lever.

A safety control is provided for the refrigerant system which is in the form of a conventional high and low pressure switch 96 which operates a solenoid valve 98 so as to admit compressed air to a cylinder 100. When the refrigerant pressure in the line 28 exceeds a predetermined pressure or the pressure in the line 36 drops below a predetermined pressure, air supplied to the cylinder 100 operates a mechanism 102 which places the operating lever 58 for the valve 56 in its mid position so as to disengage the compressor 24 from the power source.

The blower 46 is a conventional two speed blower which is normally driven at high speed for both normal and station cooling operation of the compressor. However, when the control lever 60 is moved to the "off" position, such as when no cooling is desired, the switch 110 closes a circuit to the blower 46 through a switch 104 which may be manually closed to operate the blower 46 in low speed. The switches 80 and 110 are both operated in unison by the lever 60 whereby current is supplied for operating the blower at high speed in either extreme position of the lever 60.

During normal operation of the bus it frequently happens that foreign matter such as newspapers, leaves, etc., may be drawn up to block the air flow through the condenser and when this takes place the refrigerant pressure within the condenser will become excessive and will close causing closing of the Hi-Lo pressure control switch 96 so as to stop the compressor. Closing of the switch 96 not only stops operation of the compressor but also serves to energize a warning light 108 located in the driver's compartment which then warns the driver that something is wrong with the refrigeration equipment.

A master control switch 111 is provided in the circuit as shown and must be closed before operating the bus engines. Power for the electrical controls is supplied from the usual storage battery 112.

As pointed out hereinabove the shift lever 60 cannot be shifted until the brake pedal has been depressed. When the driver depresses the brake pedal it is necessary for the air pressure in the cylinder 92 to reach a minimum of 65 pounds per square inch before the lever 60 can be moved. This means that the coach is stopped and the engine is idling. When the lever is shifted to station cooling, device 64 sets the engine throttle to a slow speed, such as 550 R. P. M. so as to render the accelerator pedal inoperative.

While the form of embodiment of the invention as herein disclosed constitutes a preferred form, it is to be understood that other forms might be adopted, as may come within the scope of the claims which follow.

What is claimed is as follows:

1. In an air conditioning system for a bus or the like, an engine, a refrigeration system including a refrigerant compressor, a condenser, an evaporator, refrigerant flow connections between said compressor, condenser, and evaporator, and blower means for circulating air to be conditioned in thermal exchange relationship with said evaporator, a variable speed ratio transmission for transmitting power from said engine means to said compressor, means for changing the speed ratio of said transmission, control means for operating said speed ratio changing means, and means operated by movement of said control means to one position for limiting the output of said engine means, said engine means comprising a pair of engines, said means for limiting the output of said engine means comprising means for rendering one of said engines inoperative.

2. In an air conditioning system for a bus or the like, engine means, refrigerating means including a refrigerant compressor, a condenser, an evaporator, refrigerant flow connections between said compressor, condenser, and evaporator, and blower means for circulating air to be conditioned in thermal exchange relationship with said evaporator, a variable speed ratio transmission for transmitting power from said engine means to said compressor, means for changing the speed ratio of said transmission, control means for operating said speed ratio changing means, means operated by movement of said control means to one position for preventing operation of said engine means above a predetermined speed range, an accelerator for controlling the speed of said engine means, and means responsive to a predetermined movement of said accelerator for preventing said transmission from operating said compressor at the highest speed ratio.

3. In an air conditioning system for a bus or the like, engine means, refrigerating means including a refrigerant compressor, a condenser, an evaporator, refrigerant flow connections between said compressor, condenser, and evaporator, and blower means for circulating air to be conditioned in thermal exchange relationship with said evaporator, a variable speed ratio transmission for transmitting power from said engine means to said compressor, means for changing the speed ratio of said transmission, control means for operating said speed ratio changing means, means operated by movement of said control means to one position for preventing operation of said engine means above a predetermined speed range, an accelerator for controlling the speed of said engine means, means responsive to a predetermined movement of said accelerator for preventing said transmission from operating said compressor at the highest speed ratio, said engine means comprising a pair of engines, said means for preventing operation of said engine means above a predetermined speed comprising means for stopping one of said engines.

4. In an air conditioning system for a bus having an engine means comprising a pair of engines for supplying power for operating said bus, a refrigerating system including a refrigerant compressor, a condenser, an evaporator, refrigerant flow connections between said compressor, condenser, and evaporator, and blower means for circulating air to be conditioned in thermal exchange relationship with said evaporator, a variable speed ratio transmission for transmitting power from said engine means to said compressor, means for changing the speed ratio of said transmission from high to low, control means for operating said speed ratio changing means, means operated by movement of said control means to one position for preventing operation of said engine means above a predetermined speed range, means operated by movement of said control means to one position for stopping one of said engines, accelerator means for controlling the speed of said engines, and means responsive to predetermined movement of said accelerator for preventing said transmission from operating said compressor at said high speed ratio.

5. In an air conditioning system for a bus having an engine means comprising a pair of engines for supplying power for operating said bus, a refrigerating system including a refrigerant compressor, a condenser, an evaporator, refrigerant flow connections between said compressor, condenser, and evaporator, and blower means for circulating air to be conditioned in thermal exchange relationship with said evaporator, a variable speed ratio transmission for transmitting power from said engine means to said compressor, means for changing the speed ratio of said transmission from high to low, control means for operating said speed ratio changing means, means operated by movement of said control means to one position for preventing operation of said engine means above a predetermined speed range, means operated by movement of said control means to one position for stopping one of said engines, accelerator means for controlling the speed of said engines, means responsive to predetermined movement of said accelerator for preventing said transmission from operating said compressor at said high speed ratio, brake means for reducing the speed of said engines, and means for preventing operation of said control means except when said brake means is in braking position.

6. In a bus, the combination, engine means for supplying power for driving said bus, a refrigerating system including a refrigerant compressor, a condenser, an evaporator, refrigerant flow connections between said compressor, condenser, and evaporator, and blower means for circulating air to be conditioned in thermal exchange relationship with said evaporator, a variable speed ratio transmission for transmitting power from said engine means to said compressor, means for changing the speed ratio of said transmission, control means for operating said speed ratio changing means, said engine means comprising a pair of engines, means operated by movement of said manual control means to one position for stopping one of said engines, brake means for stopping said bus, and interlock means between said manual control means and said brake means for preventing movement of said manual control means when said brake means is in the non-braking position.

References Cited in the file of this patent

UNITED STATES PATENTS

| | | |
|---|---|---|
| 2,178,807 | Ploeger | Nov. 7, 1939 |
| 2,180,760 | Mayo | Nov. 21, 1939 |
| 2,264,821 | Zukoski | Dec. 2, 1941 |
| 2,388,210 | Hanson et al. | Oct. 30, 1945 |
| 2,720,087 | Groene | Oct. 11, 1955 |
| 2,722,106 | Henny | Nov. 1, 1955 |